(12) United States Patent
Hild et al.

(10) Patent No.: US 8,210,545 B2
(45) Date of Patent: Jul. 3, 2012

(54) TOOL HOLDER FOR A ROTARY HAMMER

(75) Inventors: Eugen Hild, Aichtal (DE); Ulrich Bohne, Kohlberg (DE)

(73) Assignee: Robert Bosch GmbH, Stuttgart (DE)

( * ) Notice: Subject to any disclaimer, the term of this patent is extended or adjusted under 35 U.S.C. 154(b) by 1056 days.

(21) Appl. No.: 12/097,125

(22) PCT Filed: Feb. 12, 2007

(86) PCT No.: PCT/EP2007/051337
§ 371 (c)(1),
(2), (4) Date: Jun. 12, 2008

(87) PCT Pub. No.: WO2007/115852
PCT Pub. Date: Oct. 18, 2007

(65) Prior Publication Data
US 2008/0292419 A1   Nov. 27, 2008

(30) Foreign Application Priority Data
Apr. 10, 2006   (DE) .......................... 10 2006 016 804

(51) Int. Cl.
*B23B 31/107*   (2006.01)
(52) U.S. Cl. ............ 279/19.6; 279/30; 279/75; 279/905
(58) Field of Classification Search ........... 279/19–19.6, 279/22, 30, 75, 905
See application file for complete search history.

(56) References Cited

U.S. PATENT DOCUMENTS

| | | | | |
|---|---|---|---|---|
| 4,051,905 A | * | 10/1977 | Kleine | 173/104 |
| 4,565,472 A | * | 1/1986 | Brennsteiner et al. | 408/226 |
| 4,702,328 A | * | 10/1987 | McSweeney et al. | 175/320 |
| 4,787,278 A | * | 11/1988 | Bononi | 81/438 |
| 5,193,824 A | * | 3/1993 | Salpaka | 279/60 |
| 5,540,453 A | * | 7/1996 | Sakamaki | 279/60 |
| 6,193,241 B1 | * | 2/2001 | Robison | 279/137 |
| 6,241,026 B1 | * | 6/2001 | Wache et al. | 173/132 |
| 6,637,755 B2 | * | 10/2003 | Chen et al. | 279/22 |
| 7,195,247 B2 | * | 3/2007 | Shu | 279/75 |
| 7,424,841 B2 | * | 9/2008 | Liu | 81/438 |
| 7,448,302 B2 | * | 11/2008 | Huang | 81/438 |
| 7,533,889 B2 | * | 5/2009 | Baumann et al. | 279/19.7 |
| 7,752,946 B2 | * | 7/2010 | Wang | 81/125 |
| 7,845,428 B2 | * | 12/2010 | Sakamaki et al. | 173/164 |
| 7,913,592 B2 | * | 3/2011 | Hu | 81/438 |
| 2004/0026878 A1 | * | 2/2004 | Chen et al. | 279/75 |
| 2004/0232631 A1 | | 11/2004 | Chen et al. | |
| 2006/0145431 A1 | * | 7/2006 | Chang | 279/74 |

(Continued)

FOREIGN PATENT DOCUMENTS
CH   669 132   2/1989
(Continued)

*Primary Examiner* — Eric A Gates
*Assistant Examiner* — Bayan Salone
(74) *Attorney, Agent, or Firm* — Michael J. Striker

(57) ABSTRACT

A tool holder for a hand-guided drilling device, in particular for a rotary hammer, includes a receiving sleeve that is designed as a single piece in particular and that is drivable in a rotating manner for a shank part of an insertion tool. The recess is open at both end faces and limited therebetween by an inner circumferential surface of the receiving sleeve. The inner circumferential surface (62) of the receiving sleeve (34) includes at least six flat circumferential surface sections (62*n* through 62*u*; 84, 86) in the circumferential direction, with adjacent circumferential surface sections (62*n*, 62*o*; 62*p*, 62*q*; 62*r* 62*s*; 62*t*, 62*u*) forming an angle of 120 degrees.

2 Claims, 5 Drawing Sheets

U.S. PATENT DOCUMENTS

2008/0034926 A1 * 2/2008 Chaconas ................ 81/58.4

FOREIGN PATENT DOCUMENTS

| CN | 1379706 | 11/2002 |
| DE | 102 49 199 | 5/2004 |
| DE | 103 40 164 | 3/2005 |
| GB | 2 174 934 | 11/1986 |
| GB | 2174934 A * | 11/1986 |
| WO | 00/71287 | 11/2000 |
| WO | WO0071287 * | 11/2000 |

* cited by examiner

Fig. 10
Fig. 11
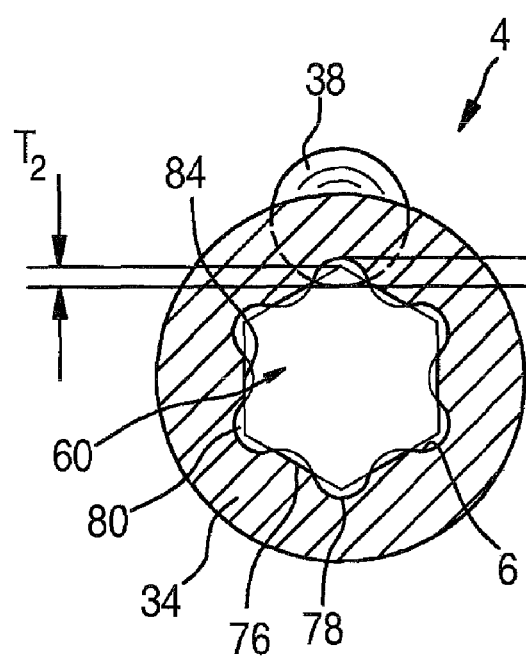
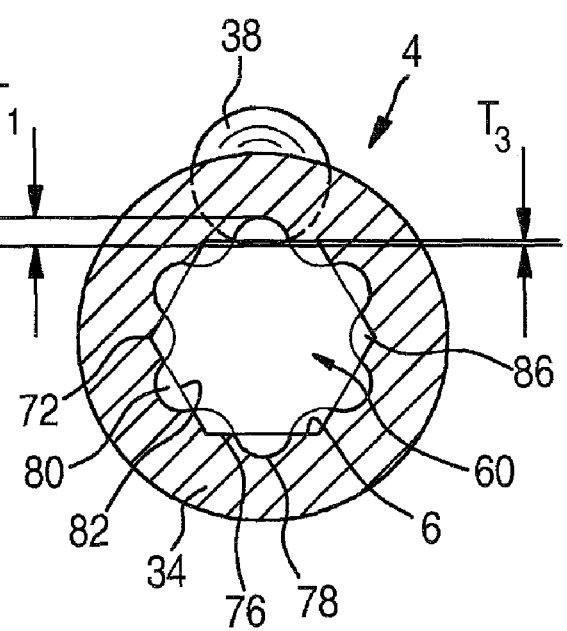

TOOL HOLDER FOR A ROTARY HAMMER

CROSS-REFERENCE

The invention described and claimed hereinbelow is also described in PCT/EP2007/051337, filed on Feb. 12, 2007 and DE 10 2006 016 804.6, filed on Apr. 10, 2006. This German Patent Application, whose subject matter is incorporated here by reference, provides the basis for a claim of priority of invention under 35 U.S.C. 119 (a)-(d).

BACKGROUND OF THE INVENTION

The present invention relates to a tool holder for a hand-guided drilling device, in particular for a rotary hammer and a drilling device with a tool holder of this type.

RELATED ART

In contrast to drills or impact hammers, in the case of which the shank part of the insertion tool used—e.g., the shank part of a wood or metal drill with a circular cross section, or the shank part of a screwdriver bit with a hexagonal cross section—is fixedly clamped in a multi-component chuck of the tool holder, rotary hammers include a tool holder with a rotationally driveable receiving sleeve that is designed as a single piece and bounds a recess that is open at both end faces for receiving the shank part of the insertion tool used. To axially lock the shank part in place in the receiving sleeve, which is also referred to as a hammer tube, a detent ball is typically provided, which is brought into engagement with an undercut of the insertion tool using a spring-loaded locking ring that encloses the receiving sleeve. For rotational driving, the shank part of the insertion tool includes a non-cylindrical cross section, e.g., in the case of the "SDS Plus" profile, two diametrically opposed driving grooves that extend in the longitudinal direction of the shank part and are open toward its rear end face, with which, when the insertion tool is inserted into the recess, complementary driving segments on the inner circumferential surface of the receiving sleeve engage.

Since the "SDS Plus" profile is suited for use only with insertion tools with a relatively thick shank part, the "SDS Mini" profile was developed recently. With the "SDS Mini" profile, the cylindrical shank part of the insertion tool—e.g., a wood or rock drill—has a smaller diameter and is provided with two diametrically projecting rotationally driving segments, while the receiving sleeve of the associated tool holder includes two complementary rotationally driving grooves. It is therefore also possible to reduce the dimensions of the tool holder, thereby making it more attractive to use smaller rotary hammers instead of impact drills for a number of applications, e.g., do-it-yourself applications. As mentioned above, the tool holders of impact drills may be equipped, as necessary, with drilling tools or with different screwdriver bits and "HEX" drill bits with a hexagonal shaft, which appeared on the market recently. Previously an additional adapter was required for this purpose for tool holders of rotary hammers.

SUMMARY OF THE INVENTION

In contrast, the inventive tool holder without a chuck, and a hand-guided drilling device that is equipped with a tool holder of this type has the advantage that the insertion tools with a shank part having a hexagonal cross section, or HEX drill bits, may be inserted directly into a receiving sleeve, which may also be equipped with other insertion tools, e.g., a shank part with an "SDS Mini" profile or a "Torx" profile, preferably those whose driving surfaces are oriented at a steep angle to the circumferential direction.

Eliminating an adapter reduces costs and interfaces. Eliminating interfaces ensures good concentricity. In addition, operation is greatly simplified for the user, since all insertion tools are inserted and locked in place in the same manner.

According to the method for attaining the object of the present invention, the receiving sleeve is provided with at least six flat circumferential surface sections along its inner circumferential surface, which form an angle of 120 degrees with adjacent, flat, circumferential surface sections, and are therefore oriented parallel to opposite circumferential surface sections on the outer circumference of the shank part—which has a hexagonal cross section—inserted in the recess of the receiving sleeve, these circumferential surface sections or a portion of these circumferential surface sections of the receiving sleeve being pressed against the particular opposite circumferential surface sections on the shank part of the insertion tool and acting as rotationally driving surfaces or torque-transmission surfaces when the receiving sleeve—together with the insertion tool—is set into rotation and a torque is transferred by the receiving sleeve via these circumferential surface sections to the insertion tool.

Other circumferential surface sections may be provided between the circumferential surface sections or between pairs of the circumferential surface sections, which are provided to interact with the circumferential surface of a shank part having a hexagonal cross section, the other circumferential surface sections serving to interact with other shank parts, e.g., circumferential surface sections that include at least one longitudinally extending, rotationally driving groove for receiving a rotationally driving segment that extends beyond a cylindrical shank part of an "SDS Mini" profile or six rotationally driving ridges that are rotationally symmetrical to the rotation axis, for receiving a "Torx" profile.

The present invention is based on the idea that, due to the similar cross-sectional dimensions of the shank parts of insertion tools having a hexagonal profile, e.g., size 6.3 (¼ inch), such as screwdriver bits or HEX drill bits, and the shank parts of insertion tools with an "SDS Mini" profile or a Torx profile, e.g., of size T45, it is possible to ensure adequate torque transmission for both profiles, even after the superposition or combination of a cross section that is suitable for receiving a hexagonal profile and a cross section that is suitable for receiving an "SDS Mini" profile or a Torx profile.

According to a preferred embodiment of the present invention, the flat circumferential surface sections that are adjacent in the circumferential direction and serve to interact with the shank part with the hexagonal profile, abut each other in pairs along apex lines, the angular separations between the apex lines amounting to 60 degrees or a multiple of 60 degrees. In this manner, the edges of the hexagonal profile are guided into the receiving sleeve and the torque is transmitted along these edges, thereby making a combination with an "SDS Mini" profile or a Torx profile possible.

In the latter case, a total of six rotationally driving ridges for receiving the six rotationally driving ribs of the Torx profile is located between two pair of adjacent, flat circumferential surface sections.

When, in particular, the tool holder is to be used only for insertion tools with a hexagonal profile and with a Torx profile, an alternative is to locate the flat circumferential surface sections located adjacent to each other in the circumferential direction for the hexagonal profile at distances from each other and between the overhanging, rotationally driving ribs of the Torx profile, the angular distances between their center lines amounting to 60 degrees or a multiple of 60 degrees. In this case, the six rotationally driving ridges for receiving the six rotationally driving ribs of the Torx profile are each located between two adjacent, flat, separated circumferential surface sections.

When the tool holder is designed for use with insertion tools with a hexagonal profile and an "SDS Mini" profile, the inner circumferential surface of the receiving sleeve advantageously includes one, two, or three rotationally driving grooves that are parallel to the rotation axis of the receiving sleeve for a corresponding number of rotationally driving segments. In the case of the "SDS Mini" profile, there are two, which are diametrically opposed and extend beyond a shank part with a circular cross section.

To ensure good torque transmission, the rotationally driving groove is bounded by two opposite, essentially parallel flanks and a groove base that is essentially perpendicular to the flanks, which form circumferential surface sections of the inner circumferential surface of the receiving sleeve, the cross-sectional shape and the dimensions of the rotationally driving groove essentially corresponding to that of the rotationally driving segments of the "SDS Mini" profile.

In this case, several partially cylindrical, circumferential surface sections, which are coaxial with the rotation axis and have diameters that nearly correspond to the diameter of the cylindrical shank part of the "SDS Mini" profile, are preferably located between adjacent pairs of flat circumferential surface sections for the hexagonal profile, or between the latter and the rotationally driving grooves.

According to a further preferred embodiment of the present invention, the tool holder includes a locking device for axially locking shaft parts—which have different cross sections—of insertion tools in the receiving sleeve, which preferably includes a locking element that is movable in a lateral recess of the receiving sleeve and is designed as a ball, which, in the case of a shank part having a hexagonal profile or a Torx profile, is brought into engagement with an annular, circumferential groove of the shank part, and, in the case of a shank part with an "SDS Mini" profile, is brought into engagement with an interruption in the driving segments.

BRIEF DESCRIPTION OF THE DRAWINGS

The present invention is explained below in greater detail in two exemplary embodiments, with reference to the attached drawing.

FIGS. 10 and 11 show cross-sectional views of another combination tool holder that is suitable for use with shank parts having a hexagonal profile and with shank parts having a Torx profile.

DETAILED DESCRIPTION OF THE EXEMPLARY EMBODIMENTS

Figure 1A:
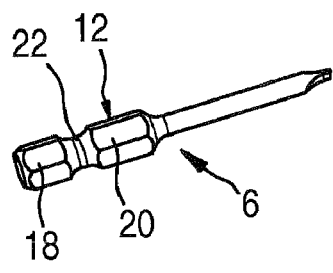
FIGS. 1a through c show a perspective view, a longitudinal side view, and an end face view of a shank part of a screwdriver bit with a hexagonal profile.

The hand-guided, electrically driven rotary hammer 2 shown only partially in the drawing includes a combination tool holder 4, which may be equipped with several different insertion tools, e.g., a screwdriver bit 6, a HEX drill bit 8, or an "SDS Mini" drill bit 10. Insertion tools 6, 8, 10 each have several types of differently-shaped shank parts 12, 14, 16, e.g., a shank part 12 or 14 with a hexagonal profile as shown in FIGS. 1a through c or 2a through c, respectively, and a shank part 16 with an "SDS Mini" profile as shown in FIGS. 3a through c. As a result, rotary hammer 2 may be used—without an adapter—for drilling with or without impact, and for screwing, after particular insertion tool 6, 8, 10 has been inserted into tool holder 4 and locked in place.

Figure 1B:
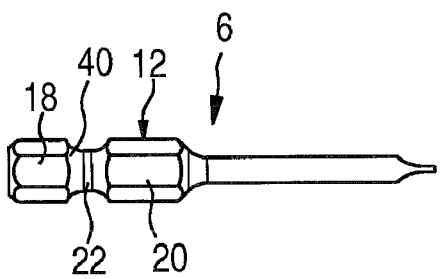
Figure 1C:
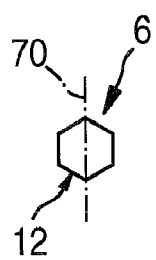
Figure 2A:
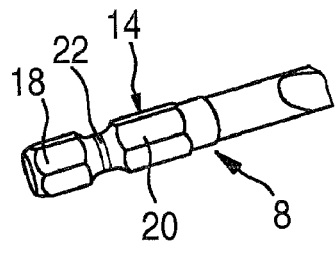
FIGS. 2a through c show a perspective view, a longitudinal side view, and an end face view of a shank part of a HEX drill bit with a hexagonal profile.
Figure 2B:
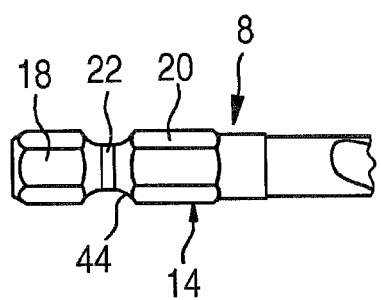
Figure 2C:
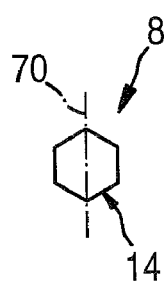
Figure 3A:
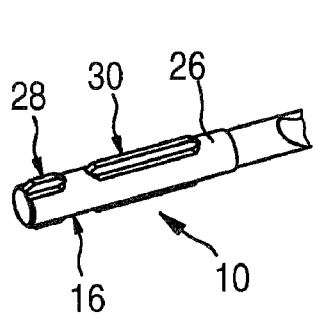
FIGS. 3a through c show a perspective view, a longitudinal side view, and an end face view of a shank part of a drilling tool with an SDS Mini profile.
Figure 3B:
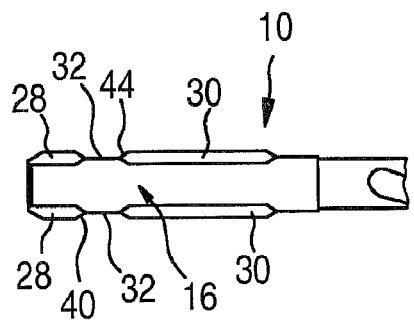
Figure 3C:
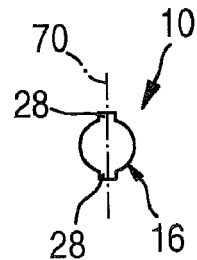

With screwdriver bit 6 shown in FIGS. 1a through c and HEX drill bit 8 shown in FIGS. 2a through c, shank part 12 or 14 includes two separated sections 18, 20 having different lengths and a regular hexagonal cross section, which are separated by a standardized circumferential groove 22 with a concave, rounded cross section. With the "SDS Mini" drill bit 12 shown in FIGS. 3a through c, shank part 16 or 26 has a cylindrical cross section and, on diametrically opposed sides of the cross section, a shorter, rear driving segment 28 and a longer, front driving segment 30 for rotationally driving drill bit 12 and for transferring torque, the sides being separated by an interruption 32.

Figure 4:
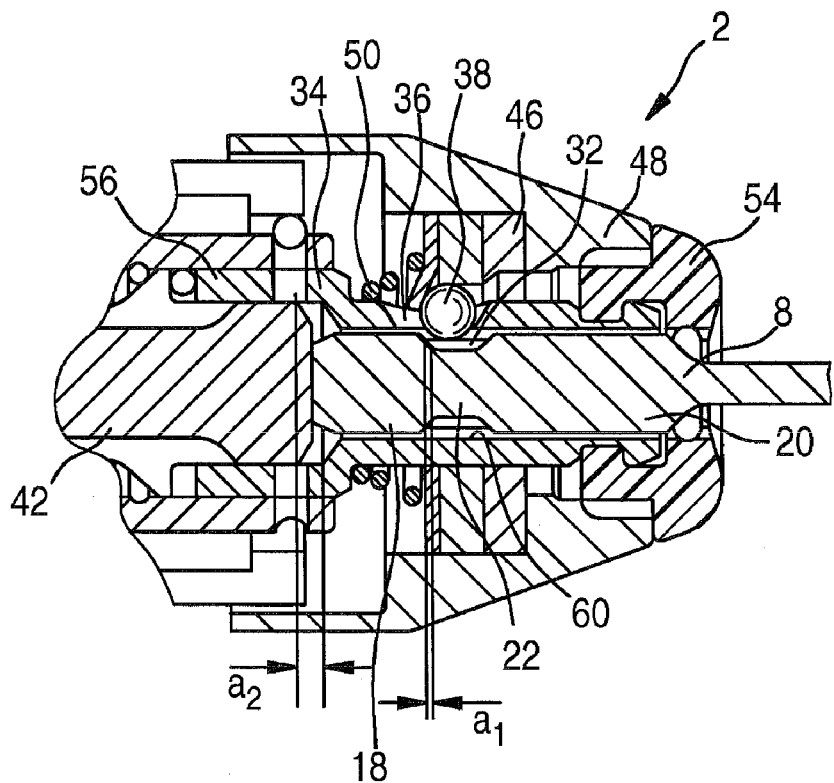
FIG. 4 shows a longitudinal side view of a combination tool holder—which is suitable for use with shank parts having a hexagonal profile and shank parts with an SDS Mini profile—of a hand-guided, electric rotary hammer after insertion of the HEX drilling tool shown in FIGS. 2a through 2c.
Figure 5:
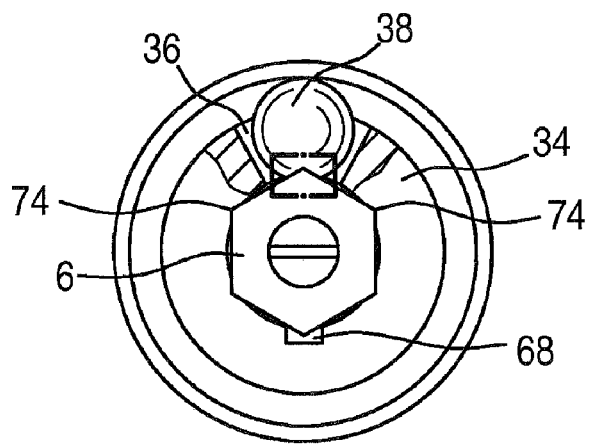
FIG. 5 shows a partially cut end-face view of a part of the tool holder after insertion of the screwdriver bit in FIGS. 1a through c.
Figure 5A:
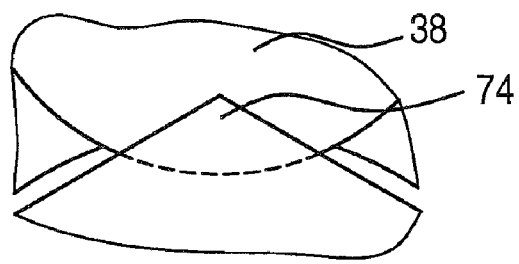
FIG. 5a shows an enlarged section of FIG. 5.
Figure 6:
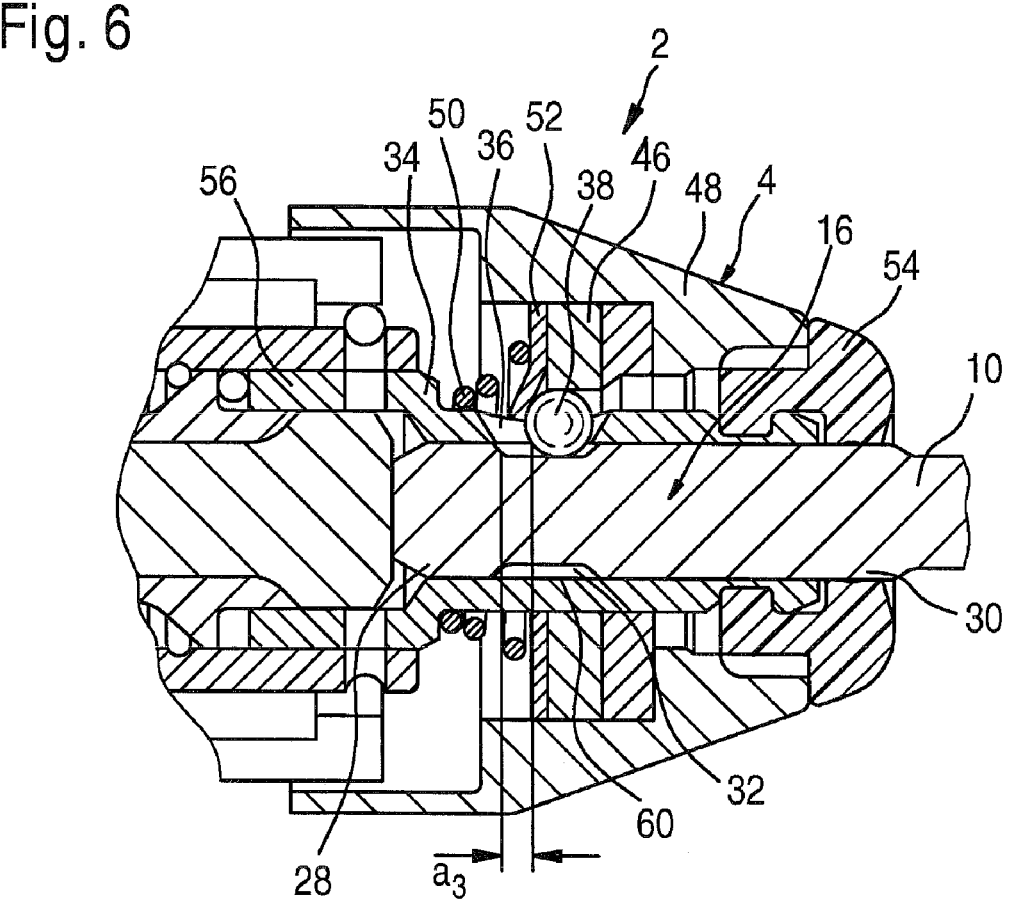
FIG. 6 shows a longitudinal sectional view of the tool holder after insertion of the "SDS Mini" drilling tool in FIGS. 3a through c.
Figure 7:
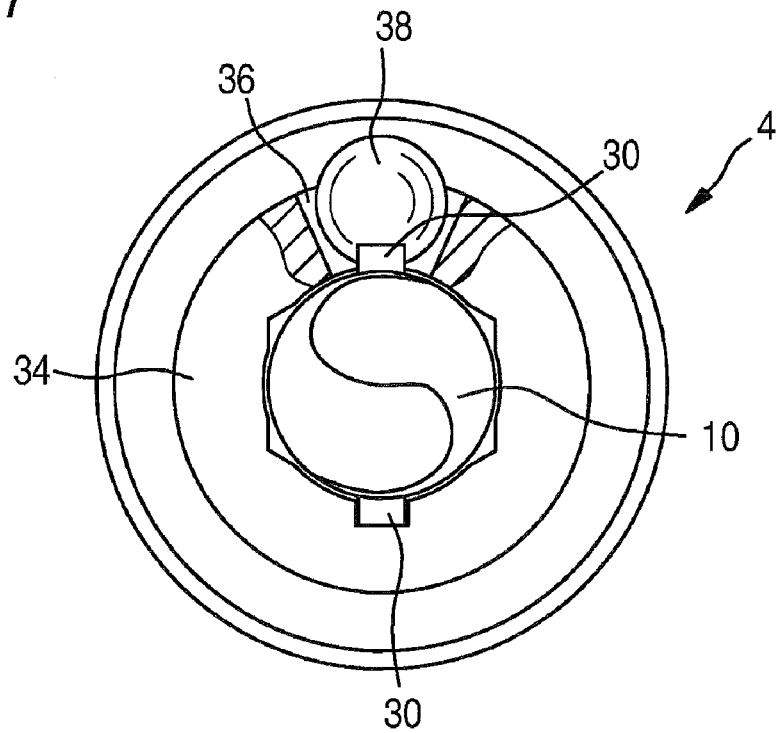
FIG. 7 shows a partially cut end-face view of a part of the tool holder after insertion of the "SDS Mini" drilling tool.
Figure 8:
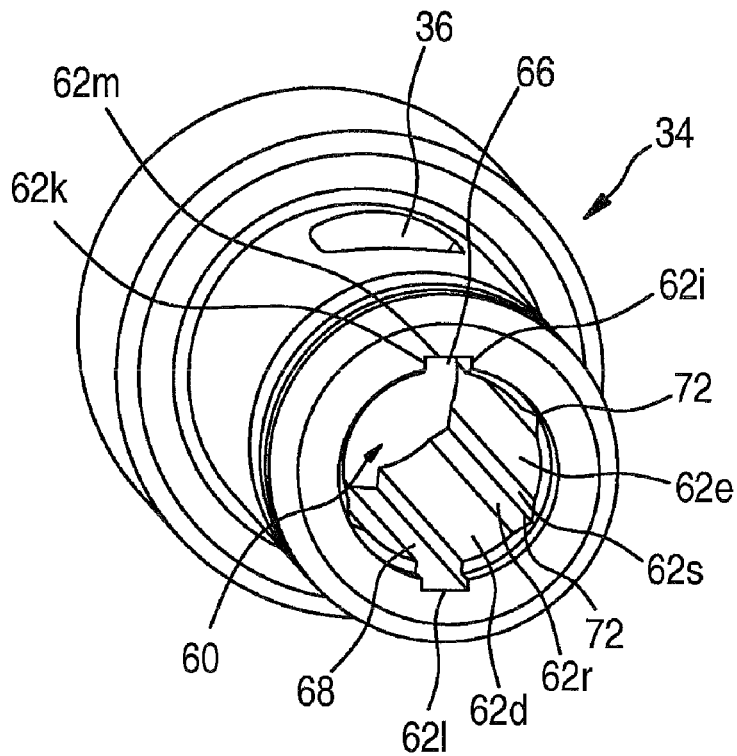
FIG. 8 shows a perspective view of a receiving sleeve of the tool holder.

As shown best in FIGS. 4 and 6, tool holder 4 includes—in a known manner—a hammer tube 34 that is open at both end faces, and that—in contrast to a chuck—is preferably designed as a single piece and is driven by a drive spindle (not shown) of rotary hammer 2 such that it rotates around its longitudinal axis. Hammer tube 34 includes a recess 36 on its top side, via which a detent ball 38 of a locking device may be brought in engagement—to axially lock insertion tool 6, 8, 10 in hammer tube 34—with groove 22 of shank part 12, 14—which has been inserted into hammer tube 34—of tool 6, 8 (FIGS. 4, 5, and 5a) or with one of the two interruptions 32 of shank part 16 of tool 10 (FIGS. 6 and 7). The position of groove 22 in screwdriver bit 6 and drill bit 8 is selected such that ball 38 is located—relative to a front shoulder 40 of section 18—such that screwdriver bit 6 and drill bit 8 are retained in hammer tube 34 with minimum axial play $a_1$, as shown in FIG. 4, when shank part 12 of screwdriver bit 6 strikes a beatpiece or striking pin 42 of rotary hammer 2, which itself has axial play $a_2$. In contrast, after SDS drill bit 10 has been inserted, ball 38 is located close to a rear shoulder 44 of front driving segment 30, as shown in FIG. 6, thereby ensuring that sufficient axial play $a_3$ exists between front shoulder 40 of rear driving segment 28 and ball 38, in order to allow impacts to be transmitted unencumbered when impact drilling is carried out.

Recess 36 has a conical cross section, which prevents ball 38 from fully entering the interior of hammer tube 34. Ball 38 is retained in recess 36 by an annular ring 46 that encloses hammer tube 34 in the circumferential direction, and that is displaceable axially in the rearward direction relative to hammer tube 34 against the force of a locking spring 50 using an actuating sleeve 48 that is the housing of tool holder 4, in order to release insertion tool 6, 8, 10 before removing it, or to lock it in place. A metal retaining plate 52 is inserted between annular ring 46 and locking spring 50, which is displaced against the force of spring 50 when insertion tool 6, 8, 10 is inserted into hammer tube 34, thereby allowing ball 38 to be moved outwardly away from the longitudinal axis of hammer tube 34 until groove 22 or interruption 32 in shank part 12, 14 or 16 slides underneath recess 36 and ball 38 is pressed by metal retaining plate 52 into groove 22 or interruption 32. A dust-protection cap 54 made of a rubber-elastic material is installed on the front end face—which points the working direction—of hammer tube 34. Dust-protection cap 54 extends beyond the front end face of hammer tube 34. Beatpiece 42 is guided inside a rear part 54 of hammer tube 34 such that it is movable axially.

Figure 9:
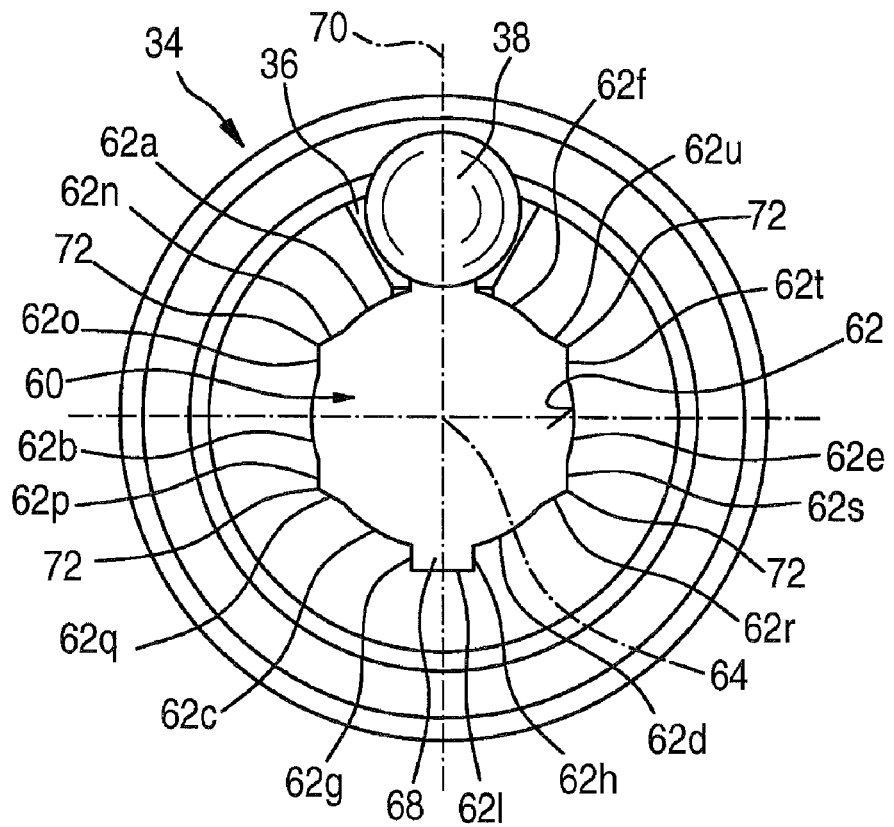
FIG. 9 shows a cross-sectional view of the receiving sleeve and a detent ball for axially locking the tool in place.

As shown best in FIG. 9, with the tool holder illustrated in FIGS. 1 through 9, a recess 60 in hammer tube 34 that serves to receive shank parts 12, 14, 16 of tools 6, 8, 10 and that encloses the rotation axis includes an inner circumferential surface 62 is subdivided in the circumferential direction into a large number of circumferential surface sections 62a through 62u. Circumferential surface sections 62a through 62u include six partially-cylindrical circumferential surface sections 62a through 62f and a total of fourteen flat circumferential surface sections 62g through 62u.

An imagined cylinder formed by the six partially cylindrical circumferential surface sections 62a through 62f has a central axis that coincides with rotation axis 64 and a radius that corresponds to the radius of a cylindrical circumferential surface of shank part 16 with an "SDS Mini" profile, so that circumferential surface sections 62a through 62f of this circumferential surface are located opposite to each other essentially without play after shank part 16 is inserted into hammer tube 34. The centers of circumferential surface sections 62a through 62f are distributed around rotation axis 64 in equal angular intervals of 60 degrees.

Six of the 14 flat circumferential surface sections 62g through 62m bound two diametrically opposed driving grooves 66, 68, which serve to receive driving segments 28, 30 of shank parts 16 with the "SDS Mini" profile, have the same cross-sectional dimensions as driving segments 28, 30, and are bounded by two parallel flanks 62g, 62h or 62i, 62k and a groove base 62l or 62m perpendicular thereto. Flanks 62g through 62k extend outwardly from adjacent partially cylindrical, circumferential surface sections 62a through 62f. Grooves 66, 68 are oriented such that one of them extends centrally through recess 36 of hammer tube 34.

The remaining eight flat circumferential surface sections 62n through 62u are located with mirror symmetry on either side of a plane 70 that extends through the center of grooves 66, 68 and, at four apex lines 72, abut each other in pairs with an interior angle of 120 degrees. The angular separations between the four apex lines 72 are equivalent to the angular distances of the corresponding edges of the hexagonal profile of shank parts 12, 14 and amount to 60 degrees each, or a multiple of 60 degrees. Apex lines 72 span an imagined cylinder that is coaxial with rotation axis 64, the diameter of this imagined cylinder being greater than the diameter of the imagined cylinder spanned by partially cylindrical circumferential surface sections 62a through 62f, while the key dimension of an imagined outer hexagon spanned by the eight flat circumferential surface sections 62n through 62u is smaller than the diameter of this latter cylinder. The imagined outer hexagon includes two surfaces, which are parallel to plane 70, so that ball 38 engages behind a corner 74 of the hexagonal profile of tool 6, 8, as shown in FIG. 5a.

FIGS. 10 and 11 each show a portion of two other tool holders 4, with which the cross section of recess 60 of hammer tube 34 is formed via the superposition of a hexagonal cross section 76 of size 6.3 (¾ inch) and a Torx profile 78 of size T45. While, with hammer tube 34 shown in FIG. 10, the corners of hexagonal profile 76 coincide with driving ridges 80 for receiving complementary driving ribs of Torx profile 78, with the hammer tube shown in FIG. 11, driving ridges 80 of Torx profile 78 extend beyond the centers of key surfaces 82 of hexagonal profile 76. A favorable aspect of the configuration shown in FIG. 10 is that locking depths T1 and T2 of both profiles 76, 78 are similar, while the flat guide and driving surfaces 84 are unfavorable for hexagon 76. With the configuration shown in FIG. 11, however, guide and driving surfaces 86 are optimal for hexagon 76, but locking depths T1 and T3 of profiles 76, 78 are very different.

Both tool holders 4 are also suitable for receiving insertion tools, the shank part of which has a hexagonal profile, but no groove 22. In this case, the tools are not locked in place axially.

What is claimed is:

1. A tool holder for a rotary hammer, comprising:
   a receiving sleeve formed as a single piece and that is drivable in a rotating manner, for a shank part of an insertion tool, a recess being open at both end faces and being bounded therebetween by an inner circumferential surface of the receiving sleeve,
   wherein the inner circumferential surface (62) of the receiving sleeve (34) includes at least six flat circumferential surface sections (62n through 62u; 84, 86) in the circumferential direction, with adjacent circumferential surface sections (62n, 62o; 62p, 62q; 62r 62s; 62t, 62u) forming an angle of 120 degrees,
   wherein the inner circumferential surface (62) of the receiving sleeve (34) includes six rotationally driving ridges (80) for a shank part with a Torx profile that are parallel to the receiving sleeve (34) and are located at identical angular distances, and wherein the rotationally driving ridges (80) are each located between two adjacent, flat, separated circumferential surface sections (84).

2. A tool holder for a rotary hammer, comprising:
   a receiving sleeve formed as a single piece and that is drivable in a rotating manner, for a shank part of an insertion tool, a recess being open at both end faces and being bounded therebetween by an inner circumferential surface of the receiving sleeve,
   wherein the inner circumferential surface (62) of the receiving sleeve (34) includes at least six flat circumferential surface sections (62n through 62u; 84, 86) in the circumferential direction, with adjacent circumferential surface sections (62n, 62o; 62p, 62q; 62r 62s; 62t, 62u) forming an angle of 120 degrees,
   wherein the inner circumferential surface (62) of the receiving sleeve (34) includes six rotationally driving ridges (80) for a shank part with a Torx profile that are parallel to the receiving sleeve (34) and are located at identical angular distances, and wherein the rotationally driving ridges (80) are each located between two pair of adjacent, flat circumferential surface sections (86).

* * * * *